(12) United States Patent
Lambert

(10) Patent No.: US 8,086,656 B2
(45) Date of Patent: Dec. 27, 2011

(54) SYSTEM AND METHOD FOR EFFICIENT BASIS CONVERSION

(75) Inventor: Robert J. Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 1118 days.

(21) Appl. No.: 11/867,594

(22) Filed: Oct. 4, 2007

(65) Prior Publication Data

US 2008/0077645 A1 Mar. 27, 2008

Related U.S. Application Data

(60) Division of application No. 09/948,793, filed on Sep. 10, 2001, now Pat. No. 7,299,253, which is a continuation of application No. PCT/CA00/00256, filed on Mar. 13, 2000.

(30) Foreign Application Priority Data

Mar. 12, 1999 (CA) ...................................... 2265389

(51) Int. Cl.
*G06F 7/72* (2006.01)

(52) U.S. Cl. ....................................................... 708/492

(58) Field of Classification Search ........................ None
See application file for complete search history.

(56) References Cited

U.S. PATENT DOCUMENTS

| | | | |
|---|---|---|---|
| 4,031,370 A | 6/1977 | Catherall | |
| 4,417,338 A | 11/1983 | Davida | |
| 4,847,801 A | 7/1989 | Tong | |
| 4,866,716 A | 9/1989 | Weng | |
| 5,485,474 A | 1/1996 | Rabin | |
| 5,761,102 A | 6/1998 | Weng | |
| 6,026,420 A | * | 2/2000 | DesJardins et al. ............ 708/492 |
| 6,058,500 A | * | 5/2000 | DesJardins et al. ........... 714/781 |

(Continued)

FOREIGN PATENT DOCUMENTS

EP 0806838 A1 11/1997

OTHER PUBLICATIONS

Lu, E-H. et al.; "VSLI Architectures for Computing Polynomials in GF(2n)"; International Conference on Systems Engineering; 1987; pp. 555-558; IEEE; New York; U.S.A.

(Continued)

*Primary Examiner* — David H Malzahn
(74) *Attorney, Agent, or Firm* — Brett J. Slaney; John R. S. Orange; Blake, Cassels & Graydon LLP

(57) ABSTRACT

This invention describes a method for evaluating a polynomial in an extension field $F_q^M$, wherein the method comprises the steps of partitioning the polynomial into a plurality of parts, each part is comprised of smaller polynomials using a $q^{-th}$ power operation in a field of characteristic q; and computing for each part components of $q^{-th}$ powers from components of smaller powers. A further embodiment of the invention provides for a method of converting a field element represented in terms of a first basis to its representation in a second basis, comprising the steps of partitioning a polynomial, being a polynomial in the second basis, into a plurality of parts, wherein each part is comprised of smaller polynomials using a $q^{-th}$ power operation in a field of characteristic q; evaluating the polynomial at a root thereof by computing for each part components of $q^{-th}$ powers from components of smaller powers; and evaluating the field element at the root of the polynomial.

18 Claims, 4 Drawing Sheets

$$A \leftarrow 0$$

$$A \leftarrow a_8 \, r^1$$

$$A \leftarrow A^2$$

$$A \leftarrow A + \underset{a_4}{r^1}$$

$$A \leftarrow A^2$$

$$A \leftarrow A + \underset{a_2}{r^1} + \underset{a_6}{r^3} + \underset{a_{10}}{r^5}$$

$$A \leftarrow A^2$$

$$A \leftarrow A + \underset{a_1}{r^1} + \underset{a_3}{r^3} + \underset{a_5}{r^5} + \underset{a_7}{r^7} + \underset{a_9}{r^9} + \underset{a_0}{r^0}$$

U.S. PATENT DOCUMENTS

| | | | |
|---|---|---|---|
| 6,192,497 B1 | 2/2001 | Yang et al. | |
| 6,219,815 B1 * | 4/2001 | DesJardins et al. | 714/781 |
| 6,895,422 B2 | 5/2005 | Walster et al. | |
| 7,299,253 B2 * | 11/2007 | Lambert | 708/492 |
| 2002/0041682 A1 * | 4/2002 | Lambert | 380/28 |
| 2008/0077645 A1 * | 3/2008 | Lambert | 708/492 |
| 2008/0177814 A1 * | 7/2008 | Lambert | 708/492 |

OTHER PUBLICATIONS

Kovac, M. et al.; "Ace: A VSLI Chip for Galois Field GF(2n) Based Exponentiation"; IEEE Transactions on Circuits and Systems II: Analog and Digital Processing; Apr. 1996; pp. 289-297; vol. 43, No. 4; IEEE; New York; U.S.A.

Weisstein, Eric W.; "Polynomial." from MathWorld—A Wolfram Web Resource. http://mathworld.wolfram.com/Polynomial.html.

Agnew, G.B. et al.; "An implementation of elliptic curve cryptosystems over $F_2155$"; IEEE Journal on Selected Communications; Jun. 1993; pp. 804-813; vol. 11, No. 5; IEEE; New York; U.S.A.

Search Report from PCT/CA0/00256 dated Jul. 7, 2000.

\* cited by examiner

```
| $a_9\ r^9$  |              |           |           |
|-------------|--------------|-----------|-----------|
| $a_7\ r^7$  |              |           |           |
| $a_5\ r^5$  | $a_{10}\ r^{10}$ |       |           |
| $a_3\ r^3$  | $a_6\ r^6$   |           |           |
| $a_1\ r^1$  | $a_2\ r^2$   | $a_4\ r^4$ | $a_8\ r^8$ |
```

$a_0\ r^0$

FIG. 2a $A \leftarrow 0$ $A \leftarrow a_8\ r^1$ $A \leftarrow A^2$ $A \leftarrow A + \underset{a_4}{r^1}$ $A \leftarrow A^2$ $A \leftarrow A + \underset{a_2}{r^1} + \underset{a_6}{r^3} + \underset{a_{10}}{r^5}$ $A \leftarrow A^2$ $A \leftarrow A + \underset{a_1}{r^1} + \underset{a_3}{r^3} + \underset{a_5}{r^5} + \underset{a_7}{r^7} + \underset{a_9}{r^9} + \underset{a_0}{r^0}$

FIG. 2b

FIG. 3a $A \leftarrow 0$ $A \leftarrow a_9 r^1$ $A \leftarrow A^3$ $A \leftarrow A + a_3 r^1 + a_6 r^2 + a_{12} r^4 + a_{15} r^5$ $A \leftarrow A^3$ $A \leftarrow A + a_0 r^0 + a_1 r^1 + a_2 r^2 + a_4 r^4 + a_5 r^5$
$+ a_7 r^7 + a_8 r^8 + a_{10} r^{10} + a_{11} r^{11}$
$+ a_{13} r^{13} + a_{16} r^{16}$

FIG. 3b

SYSTEM AND METHOD FOR EFFICIENT BASIS CONVERSION

This application is a divisional of U.S. patent application Ser. No. 09/948,793 filed on Sep. 10, 2001, now U.S. Pat. No. 7,299,253, which is a continuation of PCT/CA00/00256 filed on Mar. 13, 2000 and which claims priority from Canadian Patent Application No. 2,265,389 filed on Mar. 12, 1999, the contents of which are hereby incorporated by reference.

FIELD OF THE INVENTION

This invention relates to the field of cryptographic systems, and conversion of elements between bases used in such systems.

BACKGROUND OF THE INVENTION

It is well known that there is only one finite field of any given order, but that there are many different representations. When an extension field is built by adjoining a root of an irreducible polynomial to the ground field, the choice of irreducible affects the representation of the extension field. In general if $F_{q^m}$ is the finite field, where q is a prime and $F_q$ is the ground field over which it is defined, the elements of the finite field can be represented in a number of ways depending on the choice of basis. In order to interoperate, cryptographic systems employing finite fields often need to establish a common representation. In addition to the choice of irreducible polynomial, finite fields can also be represented by either polynomial or normal basis. A polynomial basis represents elements of $F_{q^m}$ as linear combinations of the powers of a generator element x: $\{x^0, x^1, \ldots x^{m-1}\}$. A normal basis representation represents elements as linear combination of successive q-th powers of the generator element x: $\{x^{q^0}, x^{q^1}, \ldots x^{q^{m-1}}\}$. Each basis has its own advantages, and cryptographic implementations may prefer one or the other, or indeed specific types of irreducible polynomials, such as trinomials or pentanomials.

To support secure communication between devices using different representations, basis conversion, which changes the representation used by one party into that used by another party is generally required.

Basis conversion often entails the evaluation of a polynomial expression at a given finite field element. If an element a, when represented as a polynomial, is given as $a(x)=\Sigma a_i x^i$ mod f(x), where f(x) is an irreducible, in one basis, then the conversion of the element a into a new representation using another irreducible polynomial requires that a be evaluated at r, where r is a root of the new irreducible polynomial in the field represented by f(x), then a(r) is the element a in the new representation. Any of the conjugates of r (the other roots of the new irreducible) will also induce equivalent, but different representations.

There is a need for an efficient method for evaluating these polynomials, for application to basis conversion.

SUMMARY OF THE INVENTION

In accordance with this invention there is provided a method for evaluating polynomials in an extension field comprising the steps of: partitioning the polynomials into a plurality of parts, such that each part may be computed from smaller polynomials using a q-th power operation in a field of characteristic q.

In accordance with a further embodiment of the invention there is provided a method for evaluating a polynomial in an extension field comprising the steps of computing components of the q-th powers from components of smaller powers.

BRIEF DESCRIPTION OF THE DRAWINGS

These and other features of the preferred embodiments of the invention will become more apparent in the following detailed description in which reference is made to the appended drawings wherein:

FIGS. 2(a) and 2(b) are schematic diagrams illustrating an embodiment of the invention;

FIGS. 3(a) and (b) are schematic diagrams of further embodiments of the invention.

DETAILED DESCRIPTION OF THE PREFERRED EMBODIMENTS

Figure 1:
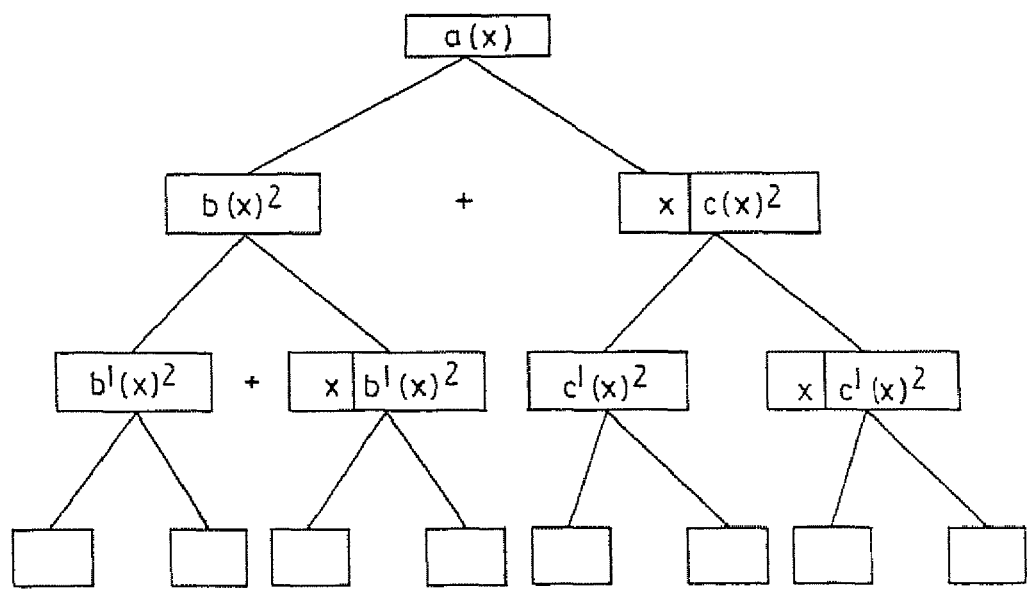
FIG. 1 is a schematic diagram illustrating an embodiment of the present invention.

In a first embodiment of the invention, we exemplify a specific case $F_{2^m}$ of the general field $F_{q^m}$, then in order to evaluate a field element $a(x)=\Sigma a_i x^i$ in $F_{2^m}$, it is noted that approximately one half of the exponents $x^i$ are even powers. These powers can be efficiently calculated from lower degree exponents of odd powers. For example, the powers for i=2, 4, 6, 8, 10 can be calculated by squaring the powers for i=1, 2, 3, 4, 5, respectively. This approach does not apply to the odd powers, but if we partition a into even and odd powers, e.g. $a(x)=a_{even}(x)+a_{odd}(x)$, and if we factor x from the odd powers, then a will be represented by a sum of even powers and x times a sum of even powers. Explicitly, $$a(x) = (a_0 + a_2 x^2 + a_4 x^4 + \ldots) + x(a_1 + a_3 x^2 + a_5 x^4 + \ldots)$$
$$= a_{even}(x) + x a'_{even}(x)$$

where $a_{even}'(x)$ is the even-powered polynomial derived by factoring x from add (x).

In a field of characteristic 2, $F_{2^m}$ squaring is a linear operation, which allows $a_{even}$ and $a_{even}'$ to be expressed as squares of polynomials of smaller (roughly one half) degree. Explicitly, defining $b(x)=a_0+a_1 x+a_4 x+a_6 x+ \ldots$ and $c(x)=a_1+a_3 x+a_5 x+a_7 x+ \ldots$, then a(x) can be expressed as $a(x)=(b(x))^2+x(c(x))^2$. Now b and c have approximately half the degree of the original polynomial a to be evaluated.

Evaluation of b (and c) can (recursively) be made by further dividing the polynomial into odd and even parts. The odd part can be shifted to an even power by factoring out x and expressing the result as a combination of squares of lower degree polynomials. At each application of the partitioning and shifting a two squaring operations and one multiplication by x are required.

At some point, the recursive partitioning can be halted and the component polynomials evaluated via one or more methods.

Note that although we have described the method for the extension fields over $F_2$, similar application can be made to other characteristics if the polynomials are divided into more components. For example, for the extension held over $F_3$, the polynomial a(x) might be divided into $a(x)=a_{0 \bmod 3}+a_{1 \bmod 3}+a_{2 \bmod 3}$, where $$a_{0 \bmod 3}=(a_0+a_3 x^3+a_6 x^6 \ldots) \quad a_{1 \bmod 3}=(a_1 x+a_4 x^4+a_7 x^7 \ldots), \text{ and } a_{2 \bmod 3}=(a_2 x+a_5 x^5+a_8 x^8 \ldots).$$

In general, for extension fields over $F_3$, the polynomial may be divided into q parts. Even over characteristic 2, the polynomial a might be broken up into more than 2 polynomials, at the cost of more multiplications by x or powers of x.

As an example of a preferred embodiment at a given size, consider conversion of polynomial representations over $F_{2^{163}}$. An element of this field is represented by the polynomial $$a(x)=a_0+a_1x+a_2x^2+\ldots a_{162}x^{162}.$$

The first branching divides a(x) into:

$$a(x) = (a_0 + a_2x + a_4x^2 + a_6x^3 + \ldots + a_{162}x^{81})^2 +$$
$$x(a_1 + a_3x + a_5x^2 + a_7x^3 + \ldots + a_{161}x^{80})^2$$
$$= (b(x))^2 + x(c(x))^2,$$

where b(x) and c(x) are each polynomials referred to as component polynomials $C_i$, $C_j$.

At the next level down, $$b(x) = (b_0 + b_2x + b_4x^2 + b_6x^3 + \ldots + b_{80}x^{40})^2 +$$
$$x(b_1 + b_3x + b_5x^2 + b_7x^3 + \ldots + b_{81}x^{40})^2$$
$$= (d(x))^2 + x(e(x))^2.$$

The polynomial c(x) is partitioned in a similar way.

As mentioned above, the partitioning of polynomials into parts may be halted and the resulting component polynomials evaluated at a root by using any one of several known methods. The positions at which the partitioning stops may be denoted as the leaves of the evaluation tree. The component polynomials at the leaves may be evaluated either directly, or with Horner's rule. However, current methods do not exploit a property of finite fields of characteristic q, wherein taking the q-th powers is usually an efficient operation.

An exemplary method will now be described for efficiently evaluating a component polynomial for extension fields over $F_2$.

At the leaf, a component polynomial $a(x)=\Sigma a_i x^i$ must be evaluated at a root of a new irreducible. Again, approximately one half of these terms will be even and can be calculated efficiently from odd powers. These odd powers will either be stored, for explicit basis conversion, or calculated explicitly by multiplication. If, for example a(x) is guaranteed to be of degree not greater than 10 (which may be the case if certain evaluation tree depths are employed), then a(x) can be evaluated from the powers 1, 3, 5, 7, 9, which are either stored or calculated. Squarings can be reduced by grouping coefficients together. This is shown schematically in FIG. 2(a) where a notional table is constructed to show the relationship between the stored or evaluated odd powers of r and the higher degree even powers of r. Thus, consider the first row in which $r^2$, $r^4$, and $r^8$ are derived by squaring $r^1$, similarly, $r^6$ is derived by squaring $r^3$ and $r^{10}$ is derived by squaring $r^5$. It is to be noted that in this example, powers of 2 are used.

Turning back to FIG. 2(a), however, the notional table may be used as shown schematically in FIG. 2(b). Thus, assume an accumulator is set initially to 0. Since we are using an extension field over $F_2$ the coefficients $a_i$ are either 0 or 1. First, if $a_8$ is 1, then $r^1$ is added to the accumulator, which consists of a copying operation in a processor. Next, the accumulator is squared. Next, if $a_4$ is 1, then $r^1$ is added into the accumulator. Again, the accumulator is squared. Now, if $a_2$, $a_6$, $a_{10}$ are one (1) then $r^1$, $r^3$, $r^5$ are added into the accumulator respectively. Again, the accumulator is squared. Finally, if $a_0$, $a_1$, $a_3$, $a_5$, $a_7$, $a_9$ are set (1), then $r^0$, $r^1$, $r^3$, $r^5$, $r^7$, $r^9$ are added into the accumulator. This completes the evaluation of a(x) at r, requiring three squares and the initial evaluation of $r^0$, $r^1$, $r^3$, $r^5$, $r^7$, $r^9$, which can be reused at another leaf evaluation.

It will be apparent to those skilled in the art that the pre-computed values technique can equally well be applied to multiplication techniques.

For polynomials of larger degrees, similar evaluations can be made from evaluation of odd powers. First, the coefficients of those exponents with the largest powers of 2 are added into the accumulator according to whether the polynomial to be evaluated has non-zero coefficients at those powers, then the result is squared. Next, powers divisible by one less power of 2 are added in as required by polynomial evaluation. Accumulation and squaring continues until the odd powers themselves are added in as required by the polynomial under evaluation.

In FIGS. 3(a) and 3(b), a similar evaluation is exemplified for an extension field over $F_3$ and for a polynomial of degree no greater than 17. Note that in this embodiment, the coefficients $a_1$ may take a value 0, 1, or 2. Thus, the powers are added with the required coefficients. In general then, for an extension field over $F_q$, powers of q are used to construct the notional table and evaluation of the polynomial proceeds by accumulation and q powering until all required powers in the polynomial are added in as required by the polynomial being evaluated.

An application of the above method to basis conversion may be illustrated as below. Given a field $F_{2^{31}}$ and a pair of bases having respective irreducible $f_1$ and $f_2$ and if $f_1=x^{31}+r^6+1$; and $f_2=x^{31}+x^3+1$. Then, a root of $f_1$ in the field represented by $f_2$ is given by $r=x^{26}+x^{24}+x^{23}+x^{22}+x^{19}+x^{17}+x^{12}+x^{11}+x^9+x^3+x^6+x^5+x^3+x^2$. Now, to convert an element $a(x)=a_{f_1}$ in the first basis to a representation in the second basis $a_{f_2}$ (that is to basis defined by $f_2$) we proceed as follows. Let $$a(x) = \sum_{i=0}^{30} a_i x^i$$

in general. For this example, we choose a specific element:

$$a(x)=x^{30}+x^{29}+x^{28}+x^{27}+x^{25}+x^{22}+x^{20}+x^{19}+x^{14}+x^{13}+x^{12}+x^{11}+x^{10}+x^8+x^7+x^6+x^3+x^0.$$

Figure 4:
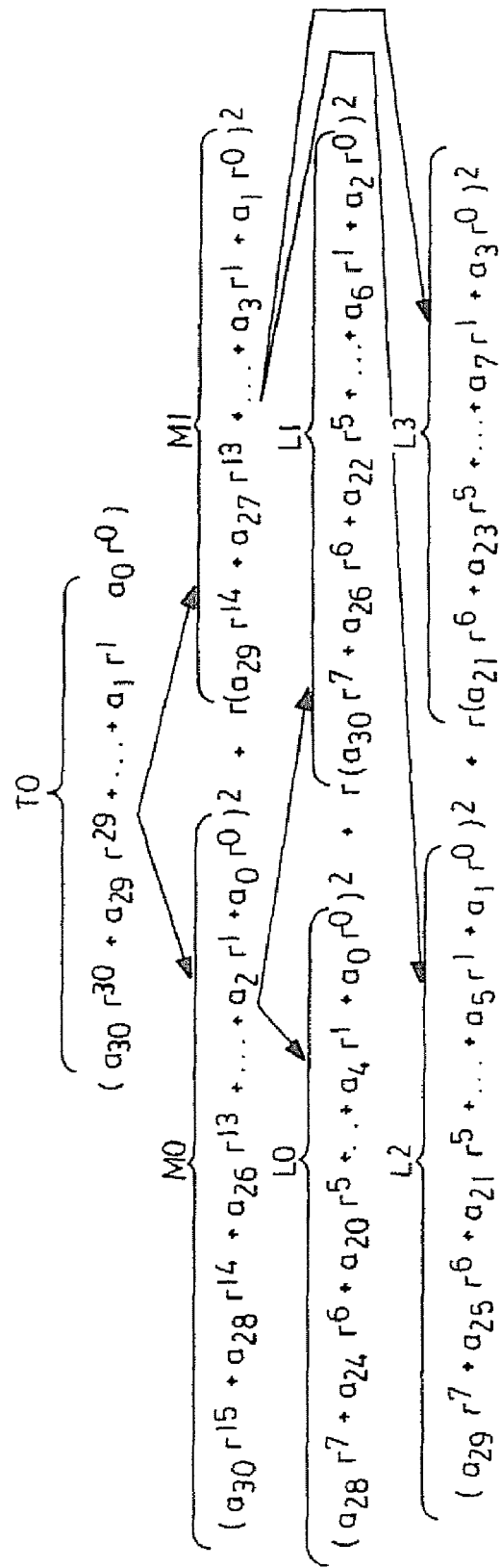
FIG. 4 is a schematic diagram of a three level tree according to an embodiment of the invention.

We assume a three level evaluation tree which is constructed in accordance with the present invention as shown in FIG. 4. At the bottom level of the tree (the leaf nodes), we require the following powers of r: $r^0$, $r^1$, $r^2$ . . . $r^7$. The odd powers are calculated $r^1$, $r^3$, $r^5$, and $r^7$ (by squaring r and 3 multiplications by $r^2$).

When a above is decomposed in the tree, the leaf nodes are:

$$L_0=(r^7+r^5+r^3+r^2+1)^2$$

$$L_1=r(r^7+r^5+r^3+r^2+r)^2$$

$$L_2=(r^7+r^3)^2$$

$$L_3=r(r^6+r^5+r^4+r^2+r+1)^2$$

To evaluate the leaf node $L_0$, we will evaluate the component polynomial, then square it and, when appropriate, further multiply its value by r to obtain the value of the leaf node:

0) zero A
1) add $r^1$ to A, square A, now $A=r^2$
2) add in $r^0$, $r^3$, $r^5$, $r^7$ to A 3) square $A=L_0$
For $L_1$, we will
0) zero A
1) add $r^1$ to A
2) square A
3) add $r^1, r^3, r^5, r^7$, to A
4) square A
5) multiply A by $r=L$
for $L_2$
0) zero A
1) add in $r^3, r^7$
2) square $A=L_2$
for $L_3$
0) zero A
1) add in $r^1$
2) square $A=r^2$
3) add in $r^1, r^3$
4) square $A=r^6+r^4+r^2$
5) add in $r^0, r^1, r^5$
   $A=r^6+r^5+r^4+r^2+r+1$
6) square A
7) multiply A by $r=L_3$
Now a(r) is built by evaluating the tree $M_0=(L_0+L_1)^2$, $M_1=r(L_2+L_3)^2$. Finally, $a(r)=T_0=M_0+M_1$.

Thus, it may be seen that his method may be applied to various cryptographic schemes such as key exchange schemes, signature schemes and encryption schemes.

Although the invention has been described with reference to certain specific embodiments, various modifications thereof will be apparent to those skilled in the art without departing from the spirit and scope of the invention as outlined in the claims appended hereto. For example, the invention may be applied to basis conversion wherein the bases to be converted between are an optimal normal basis and a polynomial basis.

The embodiments of the invention in which an exclusive property or privilege is claimed are defined as follows:

1. A computing device comprising an accumulator for evaluating a polynomial a(x) of a finite field of characteristic 2 at an element r, said polynomial a(x) having a degree and being equivalent to a sum of a plurality of components having respective coefficients $a_k$ combined with corresponding values $r^k$, said device being configured to:
   a) initialize said accumulator to zero;
   b) obtain the values $r^k$ for odd numbers k less than said degree;
   c) for each even number k less than said degree and greater than 2 which is also an exponentiation of 2, if the coefficient $a_k$ is a one, add $r^1$ to said accumulator and square said accumulator;
   d) for all other even numbers k less than said degree, if the coefficient $a_k$ is a one, add the value $r^{k-1}$ to said accumulator and square said accumulator;
   e) for each odd number k greater than zero, if the coefficient $a_k$ is a one, add the corresponding value $r^k$ to said accumulator;
   f) for k=0, if the coefficient $a_0$ is a one, add the value $r^0$ to said accumulator; and
   g) output a final value in said accumulator representing a(r).

2. The computing device according to claim 1 wherein said values $r^k$ are pre-computed and stored in a memory accessible by said computing device.

3. The computing device according to claim 1 wherein said values $r^k$ are computed by said device.

4. A method for evaluating a polynomial a(x) of a finite field of characteristic 2 at an element r, said polynomial a(x) having a degree and being equivalent to a sum of a plurality of components having respective coefficients $a_k$ combined with corresponding values $r^k$, said method comprising the steps of:
   a) initializing an accumulator to zero;
   b) obtaining the values $r^k$ for odd numbers k less than said degree;
   c) for each even number k less than said degree and greater than 2 which is also an exponentiation of 2, if the coefficient $a_k$ is a one, adding $r^1$ to said accumulator and squaring said accumulator;
   d) for all other even numbers k less than said degree, if the coefficient $a_k$ is a one, adding the value $r^{k-1}$ to said accumulator and squaring said accumulator;
   e) for each odd number k greater than zero, if the coefficient $a_k$ is a one, adding the corresponding value $r^k$ to said accumulator;
   f) for k=0, if the coefficient $a_0$ is a one, adding the value $r^0$ to said accumulator; and
   g) providing a final value from said accumulator to a cryptographic scheme representing a(r).

5. The method according to claim 4 wherein said values $r^k$ are pre-computed and stored in a memory accessible by a computing device.

6. The method according to claim 4 wherein said values $r^k$ are computed by a computing device during execution of said method.

7. A computer readable medium comprising computer executable instructions for evaluating a polynomial a(x) of a finite field of characteristic 2 at an element r, said polynomial a(x) having a degree and being equivalent to a sum of a plurality of components having respective coefficients $a_k$ combined with corresponding values $r^k$, said computer executable instructions comprising instructions for:
   a) initializing an accumulator to zero;
   b) obtaining the values $r^k$ for odd numbers k less than said degree;
   for each even number k less than said degree and greater than 2 which is also an exponentiation of 2, if the coefficient $a_k$ is a one, adding $r^1$ to said accumulator and squaring said accumulator;
   c) for all other even numbers k less than said degree, if the coefficient $a_k$ is a one, adding the value $r^{k-1}$ to said accumulator and squaring said accumulator;
   d) for each odd number k greater than zero, if the coefficient $a_k$ is a one, adding the corresponding value $r^k$ to said accumulator;
   e) for k=0, if the coefficient $a_0$ is a one, adding the value $r_0$ to said accumulator; and
   f) providing a final value from said accumulator to a cryptographic scheme representing a(r).

8. The computer readable medium according to claim 7 wherein said values $r^k$ are pre-computed and stored in a memory accessible by a computing device.

9. The computer readable medium according to claim 7 wherein said values $r^k$ are computed by a computing device during execution of said method.

10. A computer device comprising an accumulator for evaluating a polynomial a(x) of a finite field of characteristic 3 at an element r, said polynomial a(x) having a degree and being equivalent to a sum of a plurality of components having respective coefficients $a_k$ combined with corresponding values $r^k$, said device being configured to:
   a) initialize said accumulator to zero;
   b) for each number k which is less than said degree and greater than 3, and which is an exponentiation of 3, in descending order, add the coefficient $a_k$ multiplied by the value $r^1$ to said accumulator;

c) cube said accumulator;
d) obtain the values $r^k$ for each number k which when multiplied by 3 a result is less than said degree and the result was not chosen in b);
e) for each number k from d), add the value $r^k$ obtained in d) multiplied by the coefficient $a_{3k}$ to said accumulator;
f) cube said accumulator;
g) for all remaining coefficients $a_k$, add the corresponding component $a_k r^k$ to said accumulator; and
h) output a final value in said accumulator representing a(r).

11. The computing device according to claim 10 wherein said values $r^k$ are pre-computed and stored in a memory accessible by said computing device.

12. The computing device according to claim 10 wherein said values $r^k$ are computed by said device.

13. A method for evaluating a polynomial a(x) of a finite field of characteristic 3 at an element r, said polynomial a(x) having a degree and being equivalent to a sum of a plurality of components having respective coefficients $a_k$ combined with corresponding values $r^k$, said method comprising the steps of:
   a) initializing an accumulator to zero;
   b) for each number k which is less than said degree and greater than 3, and which is also an exponentiation of 3, in descending order, adding the coefficient $a_k$ multiplied by the value $r^1$ to said accumulator;
   c) cubing said accumulator;
   d) obtaining the values $r^k$ for each number k which when multiplied by 3 a result is less than said degree and the result was not chosen in b);
   e) for each number k from d), adding the value $r^k$ obtained in d) multiplied by the coefficient $a_{3k}$ to said accumulator;
   f) cubing said accumulator;
   g) for all remaining coefficients $a_k$, adding the corresponding component $a_k r^k$ to said accumulator; and
   h) outputting a final value in said accumulator representing a(r).

14. The method according to claim 13 wherein said values $r^k$ are pre-computed and stored in a memory accessible by a computing device.

15. The method according to claim 13 wherein said values $r^k$ are computed by a computing device during execution of said method.

16. A computer readable medium comprising computer executable instructions for evaluating a polynomial a(x) of a finite field of characteristic 3 at an element r, said polynomial a(x) having a degree and being equivalent to a sum of a plurality of components having respective coefficients $a_k$ combined with corresponding values $r^k$, said computer executable instructions comprising instructions for:
   a) initializing an accumulator to zero;
   b) for each number k which is less than said degree and greater than 3, and which is also an exponentiation of 3, in descending order, adding the coefficient $a_k$ multiplied by the value $r^1$ to said accumulator;
   c) cubing said accumulator;
   d) obtaining the values $r^k$ for each number k which when multiplied by 3 a result is less than said degree and the result was not chosen in b);
   e) for each number k from d), adding the value $r^k$ obtained in d) multiplied by the coefficient $a_{3k}$ to said accumulator;
   f) cubing said accumulator;
   g) for all remaining coefficients $a_k$, adding the corresponding component $a_k r^k$ to said accumulator; and
   h) outputting a final value in said accumulator representing a(r).

17. The computer readable medium according to claim 16 wherein said values $r^k$ are pre-computed and stored in a memory accessible by a computing device.

18. The computer readable medium according to claim 16 wherein said values $r^k$ are computed by a computing device during execution of said method.

* * * * *